United States Patent [19]

Obley

[11] Patent Number: 5,015,895
[45] Date of Patent: May 14, 1991

[54] INSULATED, GAS TIGHT ELECTRICAL LEAD CONDUCTOR

[75] Inventor: Alan L. Obley, Altamonte Springs, Fla.

[73] Assignee: Westinghouse Electric Corp., Pittsburgh, Pa.

[21] Appl. No.: 460,791

[22] Filed: Jan. 4, 1990

[51] Int. Cl.$^5$ .................... H02K 11/00; H01B 17/26; H01B 17/58
[52] U.S. Cl. ................... 310/71; 174/152 R
[58] Field of Search ............... 310/71, 55; 174/152 R

[56] References Cited

U.S. PATENT DOCUMENTS

| | | | |
|---|---|---|---|
| 3,524,090 | 8/1970 | Sark | 310/71 |
| 3,670,092 | 6/1972 | Updyke et al. | 174/152 R |
| 3,829,546 | 8/1974 | Hunter et al. | 174/152 R |
| 4,275,263 | 6/1981 | Chino | 174/152 R |
| 4,483,065 | 11/1984 | Meyer et al. | 174/152 R |
| 4,870,308 | 9/1989 | Sismour, Jr. | 310/71 |

FOREIGN PATENT DOCUMENTS

| | | | |
|---|---|---|---|
| 45-34336 | 11/1970 | Japan | 174/138 D |
| 0223450 | 11/1985 | Japan | 310/71 |

Primary Examiner—Steven L. Stephan
Assistant Examiner—Dennis R. Haszko
Attorney, Agent, or Firm—Michael G. Panian

[57] ABSTRACT

Method and apparatus for providing electrical insulation and hydrogen leakage resistance functions required on a radial lead portion of a field winding assembly for rotors of hydrogen cooled turbine-generators. A glass cloth tube impregnated with an epoxy resin binder is machined to desired tolerances to provide a controlled interference fit over the radial lead conductor outer surface. A coating of the epoxy resin or insulating varnish may be brushed on the interface surface. The premachined insulating tube not only prevents hydrogen gas from entering the rotor bore area, but also electrically insulates the rotor field windings from the rotor shaft.

3 Claims, 3 Drawing Sheets

INSULATED, GAS TIGHT ELECTRICAL LEAD CONDUCTOR

TECHNICAL FIELD

The invention relates to a radial lead conductor for carrying the field current in a turbine generator, and more particularly to an insulated, gas tight electrical lead conductor.

BACKGROUND OF THE INVENTION

Dynamoelectric machines, such as turbine/generators, typically have a rotor that is axially positioned within a stator core. The core comprises a plurality of axially thin annular laminations that are assembled together to form a cylindrical stator core. This core is supported within a stationary frame or housing, with the rotor disposed within the core. The rotor is formed as a cylindrical member having a central portion facing the stator core, and end shafts. An end face of the central portion is formed at the location of the shaft.

Field windings of the generator are mounted in slots machined in the body of the rotor, radially spaced from the shaft, the windings carrying DC (direct current) electricity. This current comes from a collector or exciter which is located at one end of the rotor and flows in axial leads that are positioned in a bore at the center of the generator shaft. The current is transmitted to the outer surface of the rotor shaft by a radial lead that is threaded into the axial lead. Attached to the top of the radial lead is a conductive member which transmits current from the radial lead to the field windings, which are held under retaining rings which support the windings on the rotor. One design of the conductive member is described in U.S. Pat. No. 4,870,308 issued on Sept. 26, 1989, which patent is assigned to the present assignee and is incorporated herein by reference.

Because the atmosphere surrounding the outer radial extremity of the radial lead conductor within the containment of the generator frame is a high pressure gas, typically hydrogen, used to cool the generator during its operation, it is necessary that a gas tight and leak resistant seal be provided. This is normally done where the radial lead conductor penetrates the rotor shaft to connect with the axial conductor. Also, because there is an electrical potential difference between the shaft and the field winding, this gas seal must also have certain minimum dielectric properties to minimize electrical leakage current flow from the field winding potential to the shaft ground potential.

A conventional method of insulating the radial lead conductor is performed by wrapping a glass cloth around the conductor until the required total electrical insulation thickness has been obtained. Typically, this glass cloth is impregnated with a "B" stage resin. Heat shrinkable material is then applied over the insulation to consolidate the insulation during the subsequent oven cure that chemically changes the B-stage resin and glass material into a consolidated structure around the radial lead conductor. An example of the use of a heat shrinkable insulation method can be found in application Pat. Ser. No. 147,703 filed on Jan. 25, 1988 and which is assigned to the present assignee. Such a typical insulation means for the radial lead conductor is shown in FIG. 1. The outside diameter of the consolidated insulation is then machined to required dimension and surface finish. As can be seen in FIG. 1, a void may occur with the insulation wrapping method due to the discontinuity formed at the area adjacent the beginning of the insulation wrap and the subsequent covering layers of insulation. Moreover, a required pre-tension of the wrap layers for the insulation is needed around the radial lead conductor to prevent hydrogen leakage. Furthermore, the outer surface of the insulation wrap may contain wrinkles after the oven cure due to the interaction of the heat shrinkable material wrapped over the insulation, causing a non-uniform inelastic compression across the thickness of the insulation wrap. Whereas such minor abnormalities may be acceptable in certain processes, the radial lead conductor insulation requires more exacting tolerances.

DISCLOSURE OF THE INVENTION

It is therefore an object of the present invention to provide an improved method for electrically insulating a radial lead of a turbine/generator.

It is another object of the present invention to provide an improved insulation means which is impenetrable to gas leakage between it and the radial lead conductor.

It is a further object of the present invention to provide a pre-cured and pre-machined insulation tube for the radial lead conductor that is easier to replace than for conventional insulation means.

The above objects are attained by the present invention, according to which, briefly stated, a dynamoelectric machine comprises a stator core and a rotor disposed within the core and spaced therefrom. The rotor includes a shaft having a plurality of split axial leads disposed within an internal bore therein and a radial slot extending from the bore to the surface of the shaft, and a radial lead conductor connected to the split axial leads and projecting above the surface of the shaft. A plurality of field windings are radially spaced about the rotor shaft and a conductive member electrically connects the radial lead conductor to the field windings. The improvement comprises means for insulating the radial lead conductor such that it is impermeable to gas flow therearound, and electrically insulates the shaft from the field winding.

BRIEF DESCRIPTION OF THE DRAWINGS

Various other objects, features, and advantages of the invention will become more apparent by reading the following detailed description in conjunction with the drawings, which are shown by way of example only, wherein.

DETAILED DESCRIPTION OF THE PREFERRED EMBODIMENT

Figure 2:
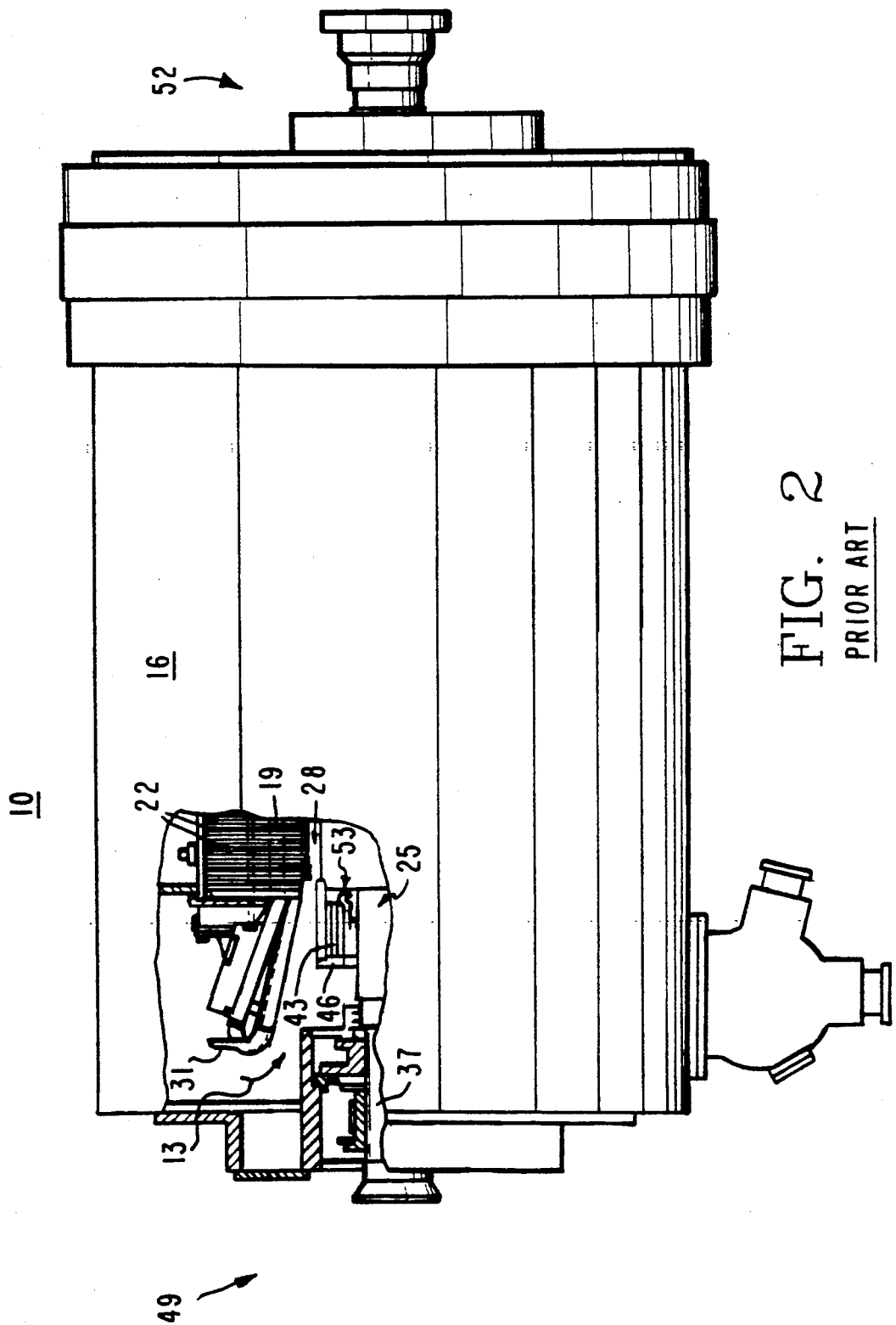
FIG. 2 is a transverse sectional view of a typical turbine/generator
Figure 3:
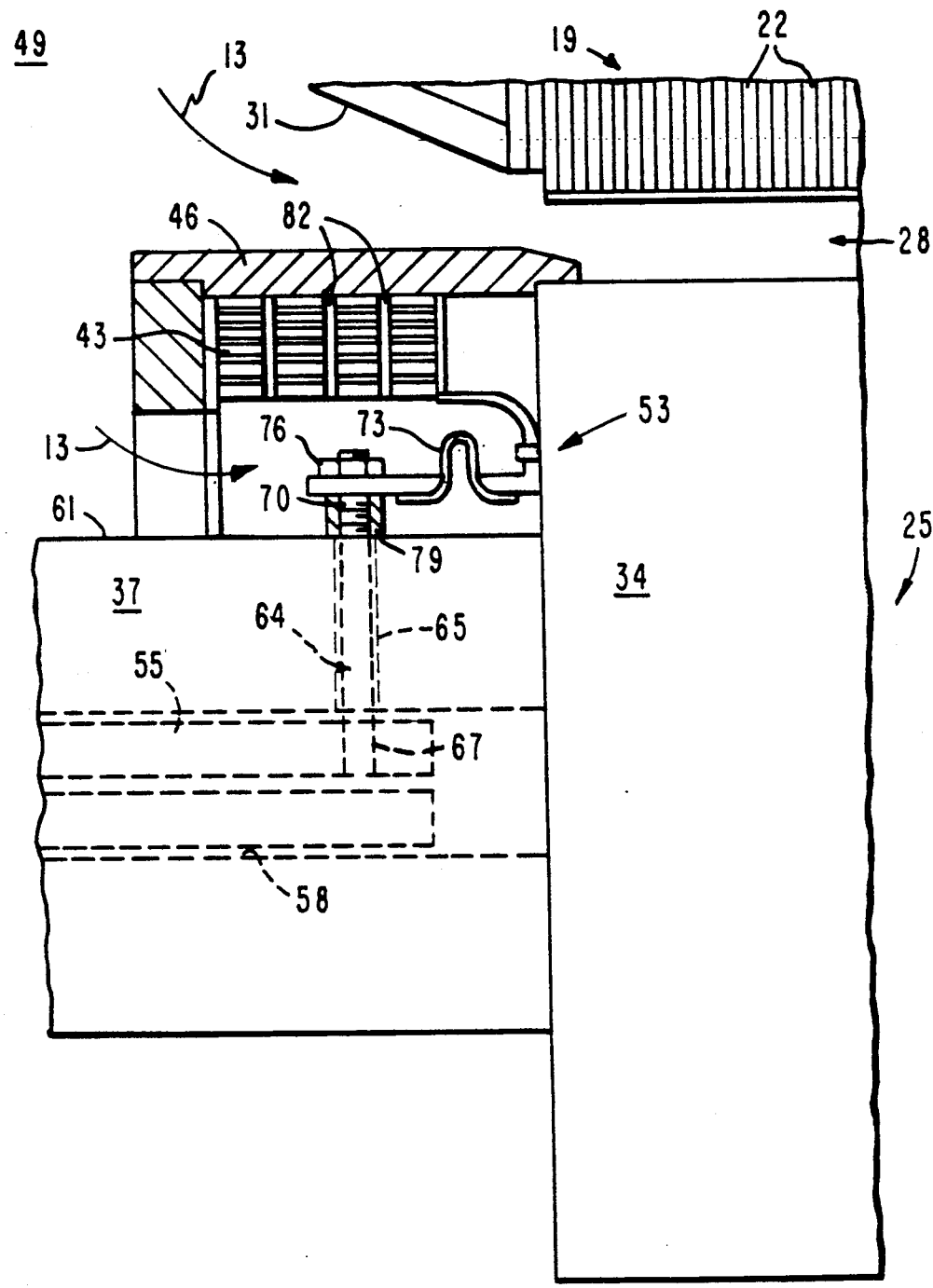
FIG. 3 is an enlarged view of a portion of the turbine/generator of FIG. 1, schematically showing the position of the radial lead conductor.

Referring now to the drawings in detail, FIGS. 2 and 3 schematically illustrate a dynamoelectric machine 10, such as a large turbine/generator, of gas ventilated construction. Typically, hydrogen gas is circulated, as indicated by arrows 13, under pressure through the generator 10, which has a stationary outer gas-tight housing 16, to cool the generator 10 during is operation. The generator 10 has a laminated cylindrical stator core 19, which is formed from a plurality of axially adjacent laminations 22, surrounding a rotor 25. The stator core 19 is spaced from the rotor 25 so as to leave a gap 28 therebetween. Stator winding coils, (not shown) are interconnected on both axial ends of the stator core 19, and include stator end turns 31. The rotor 25 has a central portion 34 disposed within the cylindrical core 19 and a shaft 37 extending axially therefrom. A plurality of field windings 43 are mounted on the rotor 25 by a retaining ring 46, such that the windings 43 are radially spaced from the shaft 37. These windings 43 carry DC (direct current) electricity, the current being transmitted from a collector or exciter (not shown) which is located adjacent one end 49 of the rotor 25. The other end 52 of the rotor 25 has the shaft 37 connected to a turbine (not shown) in a manner which is well known in the art. The output of the exciter is connected to the field windings 43 by a field winding assembly 53. The current flows through split axial leads 55 which are positioned in a bore 58 in the rotor 25, and is then transmitted to the shaft outer surface 61 by a radial lead conductor 64 that is disposed within a hole or cavity 65 in the shaft 37 and threaded 67 into the axial lead 55. An upper end 70 of the radial lead conductor 64 projects above the surface 61, and is connected to a conductive member 73 which transmits current from the radial lead 64 to the field windings 43. The radial lead conductor 64 may be connected to the conductive member 73 such as by threaded nut 76 co-acting with the threaded upper end 70 of the radial lead conductor 64 and a washer 79 or other spacer used to space the conductive member 73 from the surface of the shaft 37.

Figure 1:
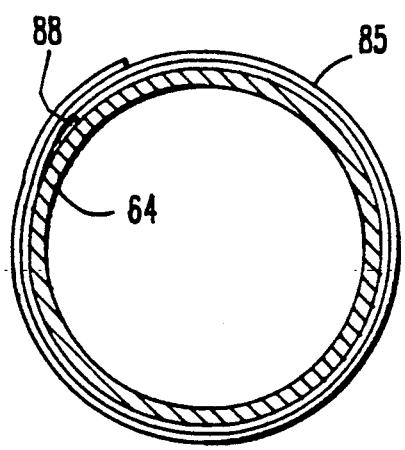
FIG. 1 is a cross-sectional view of a typical prior art method of insulating a radial lead conductor.

In order to cool central station generators during operation, a gas such as hydrogen is circulated through the interior of the enclosed generator 10. The gas, as indicated by arrows 13, flows through the interior of the generator 10 within the housing 16, especially around the stator core 19 and through the gap 28 between the core 19 and the rotor 25. Also, the coolant flows through the area of the field winding assembly 53 connections, including around the upper end 70 of the radial lead 64 and the conductive member 73, through radial flow holes 82 in the rotor field windings 43. It is important to prevent hydrogen gas from flowing from around the top 70 of the radial lead conductor 64 down through the hole 65 in the rotor shaft 37 and into the rotor bore 58 containing the split axial leads 52, to which the lower end 67 of the radial lead conductor 64 is attached. Such a passageway would permit hydrogen gas to leak into areas external to the generator housing 16. In conventional radial lead conductors, (FIG. 1) an insulation sheet 85 is wrapped around the conductor 64, and comprises several turns of insulation 85. This can lead to the creation of a gap 88 at the area where the insulation wrap is started and the second layer overlaps the first. This gap 88 may create a void area along the length of the radial lead conductor 64 which can lead to coolant leakage into the rotor bore 58 area. It is highly desirable to prevent any hydrogen gas leakage from the interior of the generator 10 to an exterior portion via the rotor bore 58, by eliminating this void space.

Figure 4A:
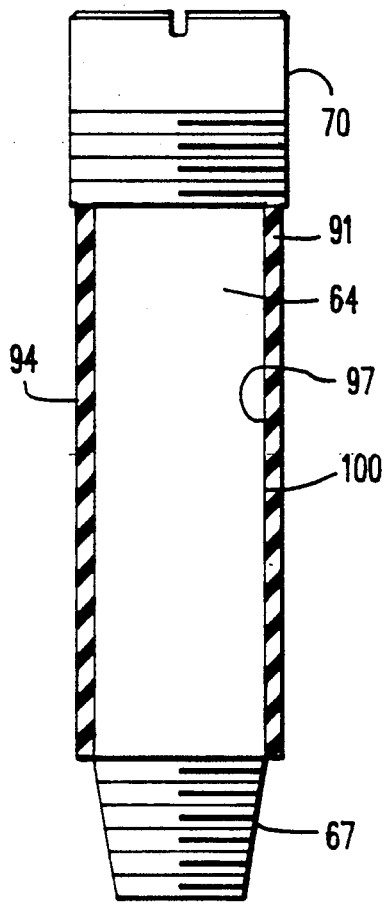
FIGS. 4 and 4B are views of a radial lead conductor having an improved insulation means according to the present invention.

An improved means for insulating the radial lead conductor 64 such that it is impermeable to gas flow from its upper portion 70 to the rotor bore 58 at its lower portion 67 is shown in FIG. 4A. It is comprised of a pre-cured and pre-machined tube 91 of suitable material having an interference fit over the radial lead conductor 64 body. Preferably, the insulating tube 91 is made of a glass cloth impregnated with an epoxy material, the composite referred to as G-11. As shown in FIG. 4A, the insulation tube 91 spans the radial lead conductor 64 from the threads 70 on its upper portion for connecting to the conductive member 73 and the field windings 43, to the attachment threads 67 on its lower portion for securing the radial lead conductor 64 to the split axial leads 55 in the rotor bore 58.

In order to construct the improved radial lead conductor insulator, a glass cloth base material having a suitable resin binder, the composite known as G-11, is formed into a generally cylindrical shape. The cylindrically-shaped, resin impregnated glass cloth is then cured, such as by heating, and formed into a rigid tube 91 of insulating material. After the insulation tube 91 has hardened, it can then be machined to the required tolerances, such as the outside diameter 94 of the tube 91 to fit within the hole 65 in the rotor shaft 37, into which the radial lead conductor 64 is positioned. More importantly, the inside diameter 97 of the insulation tube 91 is machined to be no greater than that of the outside diameter 100 of the radial lead conductor 64 so as to provide an interference fit between the two. The inside diameter 97 is preferably slightly less than the outside diameter 100 of the radial lead conductor 64. This interference fit can be tolleranced to fit within a predetermined and designed contact pressure range to the outside diameter 100 of the radial lead conductor 64, thus eliminating the void 88 between the radial lead and the insulation produced by the conventional wrap-on method. See FIG. 40. This interference fit and the resultant contact pressure are much less operator dependent and more readily controllable during manufacture of the insulation tube 91. Another advantage that the insulation tube or sleeve of the present invention provides is that it does not have to be machined after assembly on to the radial lead conductor 64, which can give rise to, for example, damage to the conductor 64.

After the pre-cured and pre-machined insulation tube 91 has been manufactured, the radial lead conductor 64 is prepared for the insulation tube 91. A layer of epoxy resin or insulating varnish can be applied, such as by brushing, over the outer surface 100 of the radial conductor 64. In this way, any machining surface marks on the inside diameter 94 of the insulation tube 91 are occupied by the epoxy resin or insulating varnish. This resin can be utilized to not only fill these machining surface marks, but also to help secure the insulation tube 91 about the radial lead conductor 64. The insulation tube 91 is also coated and heated, causing the tube 91 to expand so that it can slide over the pre-coated conductor 64. As the insulation tube 91 cools, it shrinks to its interference fitting diameter to tightly fit over the radial lead conductor 64 to provide a gas tight, electrical insulating sleeve therefor.

Figure 5:
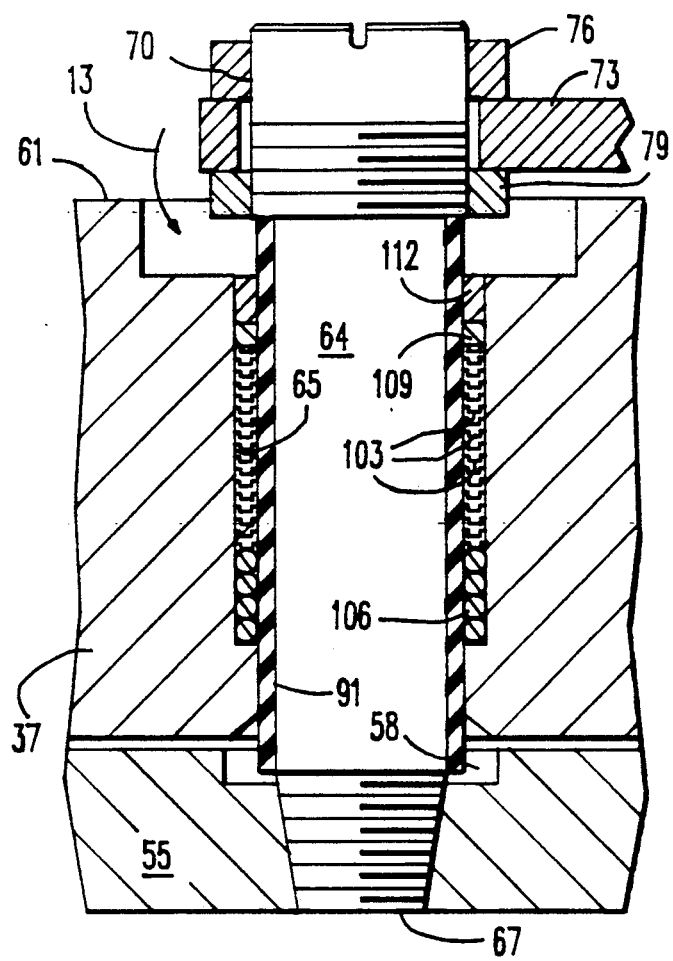
FIG. 5 is a detailed view of a generator rotor having insulated radial lead conductor according the present invention.
Figure 4B:
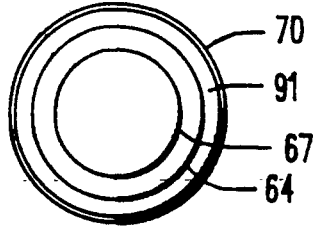

As shown in FIG. 5, the improved radial lead conductor 64 having the insulation tube 91 thereon is then installed in the appropriate position within the hole 65 of the rotor shaft 37. The bottom portion 67 is threaded into the split axial lead 55. The appropriate packing seals 103, spring 106, spacer 109, and packing nut 112 are placed around the insulated radial lead 64 to fill the clearance hole 65 within the shaft 37. The present invention thus prevents the gas 13 under pressure from entering the rotor bore 58 from between the insulation tube 91 and the radial lead conductor 64 near the upper portion 70 of the radial lead 64 at the shaft outer surface 61. Thus, coolant gas is prevented from entering the bore 58 in the rotor shaft 37 in the area of the split axial leads 55 via the interface of the radial lead and the insulation.

Another advantage of the present invention is that if necessary, insulation about the radial lead conductor 64 can be replaced in the field without requiring special wrapping machinery. Also, the need for a high temperature curing oven during maintenance operations is obviated. Furthermore, there is no need for a heat shrinkable material to be wrapped over the insulation to closely fit the insulation about the outer diameter 100 of the radial lead conductor 64. The insulation tube 91 provides a further advantage in that it also provides an electrical insulation between the field windings 43 and the axial leads 55, which are typically of a different electrical potential.

While specific embodiments of the invention have been described in detail, it will be appreciated by those skilled in the art that various modifications and alterations would be developed in light of the overall teachings of the disclosure. Accordingly, the particular arrangements disclosed are meant to be illustrative only and not limiting as to the scope of the invention which is to be given the full breadth of the appended claims and in any and all equivalents thereof.

What is claimed is:

1. A dynamoelectric machine having a stator core, a rotor disposed within the stator core and spaced therefrom, the rotor including a shaft having a split axial lead disposed in an internal bore therein and a radial hole extending from the bore to the surface of the shaft, a radial lead conductor connected to said axial lead and projecting above the surface of the shaft, a plurality of field windings radially spaced about the rotor shaft, a conductive member for electrically connecting the radial lead conductor to said field windings, and means for insulating the radial lead conductor such that it is impermeable to gas flow between the radial lead conductor and said insulating means and electrically insulates said split axial lead from said field windings, wherein said insulating means is comprised of a generally rigid insulating tube formed of a glass cloth impregnated with an insulating resin, the insulating tube providing an interference fit with the radial lead conductor.

2. The dynamoelectric machine of claim 1, wherein said insulating means further comprises an insulating resin coating disposed between the radial lead conductor and the insulating tube.

3. The dynamoelectric machine of claim 2, wherein the dynamoelectric machine is an electric generator.

* * * * *